(12) United States Patent
Ghassemzadeh et al.

(10) Patent No.: US 7,155,192 B2
(45) Date of Patent: Dec. 26, 2006

(54) MULTI-ANTENNA/MULTI-RECEIVER ARRAY DIVERSITY SYSTEM

(75) Inventors: Saeed S. Ghassemzadeh, Andover, NJ (US); Richard Henry Erving, Piscataway, NJ (US); Robert Raymond Miller, II, Convent Station, NJ (US); Christopher W. Rice, Parsippany, NJ (US)

(73) Assignee: AT&T Corp., New York, NY (US)

( * ) Notice: Subject to any disclaimer, the term of this patent is extended or adjusted under 35 U.S.C. 154(b) by 896 days.

(21) Appl. No.: 09/962,994

(22) Filed: Sep. 25, 2001

(65) Prior Publication Data

US 2003/0060178 A1 Mar. 27, 2003

(51) Int. Cl.
*H04B 1/06* (2006.01)
(52) U.S. Cl. ............................... 455/277.1; 455/277.2; 455/137
(58) Field of Classification Search ............... 455/3.01, 455/3.02, 46, 500–506, 533.1, 132–140, 455/161.2, 161.3, 226.1, 226.2, 226.3, 226.4, 455/273, 277.2, 296; 370/400, 441–442; 375/347–349
See application file for complete search history.

(56) References Cited

U.S. PATENT DOCUMENTS 4,733,402 A * 3/1988 Monsen ....................... 375/347
5,898,741 A * 4/1999 Nagashima ................. 375/347
6,314,305 B1 * 11/2001 Solondz et al. .......... 455/562.1
6,664,921 B1 * 12/2003 Pratt ..................... 342/357.06

FOREIGN PATENT DOCUMENTS

| EP | 0 709 974 A1 | 1/1996 |
| EP | 1 045 531 A2 | 10/2000 |
| EP | 1045531 A2 | 10/2000 |
| WO | WO 97/28615 | 8/1997 |
| WO | WO 9728615 A1 * | 8/1997 |

OTHER PUBLICATIONS

Kong, Nign and Milstein, Laurence B., "Average SNR of a Generalized Diversity Selection Combining Scheme", *IEEE Communications Letters*, Mar. 1999, vol. 3, No. 3, pp. 57-59.

* cited by examiner

*Primary Examiner*—Melur Ramakrishnaiah

(57) ABSTRACT

The present invention is a system for increasing Signal-to-Noise Ratio (SNR) in a wireless communication system comprising a plurality of antennas each antenna providing a signal, a device for selecting a subset of signals provided by the plurality of antennas, a maximum ratio combiner for summing the selected subset of signals provided by the plurality of antennas, and a decision device for measuring the selected subset of signals against a predefined threshold. The device for selecting the subset of signals is coupled to the plurality of antennas. The maximum ratio combiner is coupled to the selected subset of signals and the decision device for measuring the selected subset of signals against a predefined threshold. The decision device is coupled to the selecting device such that one selected signal of the selected subset of signals is replaced by an unused signal provided by the plurality of antennas.

14 Claims, 5 Drawing Sheets

MULTI-ANTENNA/MULTI-RECEIVER ARRAY DIVERSITY SYSTEM

FIELD OF THE INVENTION

The invention relates to multiple-antenna and multiple-receiver arrays for use in increasing Signal-to-Noise Ratio (SNR) at the receiver. In particular, the present invention uses polarization and spatial diversity to improve the SNR at the receiver.

BACKGROUND OF THE INVENTION

In wired or fiber systems, there is primarily only one signal path which provides a clean, non-interfering channel through which the signal propagates. In wireless communication systems, signal propagation is mainly by way of scattering from the surfaces of buildings, cars, trees, walls and furniture and by diffraction over and/or around these objects, causing the transmitted signal to arrive at the receiver via multiple paths through the air. The collection of propagation paths traversed by the signals from the transmitter to the receiver is called the channel. Due to the multipath effect, signals may arrive in-phase or out-of-phase with one another and at varying amplitude levels. To further complicate matters, as the physical objects within the channel move (i.e. the receiver, transmitter or objects in the path between the transmitter and receiver), the channel changes. This provides a time-varying component to almost all wireless channels. The effect of this time-varying channel is a time-varying received signal amplitude and phase at the receiver. Without using techniques to compensate for this variation, extra signal-to-noise margin must be maintained at the receiver to ensure reliable communications.

Diversity is one technique used to combat time-varying channel effects. Diversity may be used in any combination within the time, frequency, polarization, or spatial domains. Simple diversity techniques can provide tremendous improvements in the signal level at the receiver. The key, as in any technique, is to provide the maximum benefit for the minimum penalty (size, cost, etc.).

SUMMARY OF THE INVENTION

The multi-antenna/multi-receiver switch array diversity system of the present invention uses spatial and polarization diversity to improve performance at the receiver. Four antennas at the receiver provide four unique (uncorrelated or low-correlation) versions of the signal at their terminals. Positions 1 and 2 (providing spatial diversity) each have two antennas in cross-polarization (A&B) to one another. The cross-polarization provides polarization diversity. Thus, the four antennas are both polarization and spatially diverse. This provides polarization diversity for each spatially diverse position.

The present invention takes advantage of a blind switching scheme based on a predefined threshold and algorithm to combine dually polarized and/or multiple antennas to increase SNR at the receiver. The increase in the SNR may be used to decrease the Bit Error Rate (BER), increase the overall Quality of Service (QoS) or reduce transmit power requirements for narrowband or wideband communication systems operating in wireless environments.

The switched antenna array concept of the present invention seeks to optimize the tradeoff between the benefit from diversity implementation and penalty in terms of size and cost to implement. The novelty of the present invention centers around the combined use of spatial and polarization diversity.

It is, therefore, an object of the present invention to use polarization and spatial diversity to increase SNR at the receiver.

It is another object of the present invention to use a blind switching algorithm to increase SNR at the receiver.

BRIEF DESCRIPTION OF THE DRAWINGS

The invention is best described with reference to the detailed description and the following figures, where.

DETAILED DESCRIPTION OF THE PREFERRED EMBODIMENTS

In the present invention, four antennas at the receiver provide four unique (uncorrelated) versions of the signal at their terminals. Positions 1 and 2 (providing spatial diversity) each have two antennas in cross-polarization to one another, thus providing polarization diversity. Having four antennas that are both polarization and spatially diverse provides polarization diversity for each spatially diverse position.

One option at this point would be to maximally combine the signals at all four of the antennas into the receiver. Each signal would require its own receiver chain, making this a costly option. In addition, simulations and field results show that one or two signals dominate the contribution at the receiver. The two highest signals are chosen from the four available signals.

Preferably, an algorithm is used that combines any two of these into a maximal ratio combining receiver. The advantage of this approach is twofold:

1. Only one spatial distance is required to provide diversity (typically one wavelength) between spatially diverse antennas at position 1 and position 2. With the spatial separation between positions 1 and 2, each antenna is unique (diverse) from the remaining three and only one wavelength physical separation was required to do this.
2. By using the two highest signals, most of the benefit from the four input case of maximal combination could be obtained for half the receiver cost.

Figure 1:
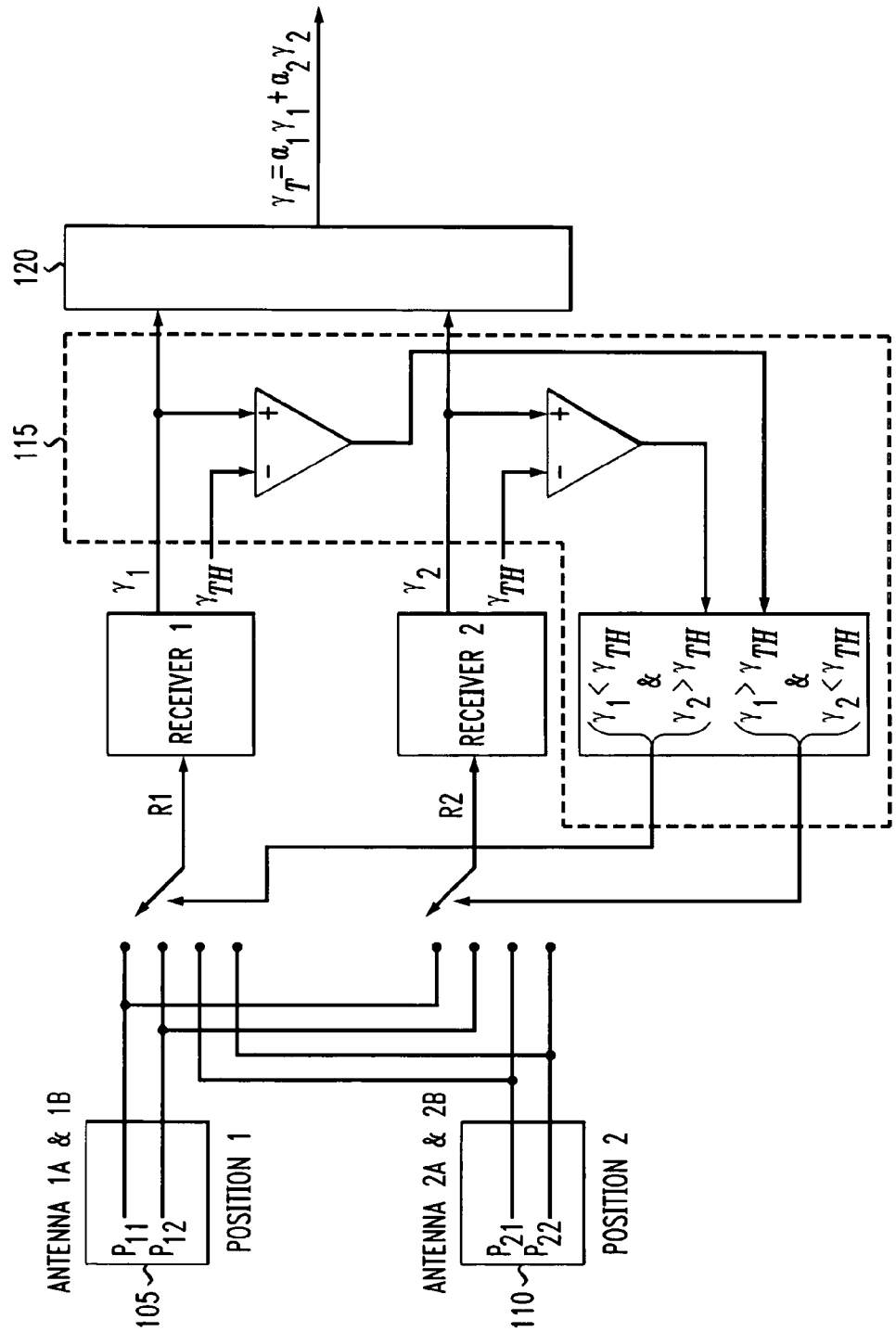
FIG. 1 is a block diagram of the switched array diversity system.

FIG. 1 is a block diagram of the switched antenna array diversity system concept. Four input signals $P_{11}$, $P_{12}$, $P_{21}$ and $P_{22}$ are present with $P_{11}$ representing antenna position 1 with polarization A, $P_{12}$ representing antenna position 1 with polarization B, $P_{21}$ representing antenna position 2 and polarization A and $P_{22}$ representing antenna position 2 and polarization B. Switch-1 105 and switch-2 110 each choose from among the four signals. Each switch 105 and 110 selects the highest signal but the switches are prevented from selecting the same signal and do not switch at the same time. From the four input signals present, two ($R_1$ and $R_2$) are chosen and maximally combined using a maximum ratio combiner 120 to provide a composite signal. As shown, any two of the signals (represented by $\gamma_1$ and $\gamma_2$) may be combined with one another. Each of the signals may be adjusted by a coefficient, e.g., $\alpha_1$ and $\alpha_2$. The two selected signals ($R_1$ and $R_2$) are inspected in the "decision block" 115 and if one of the signals drops below a predefined threshold, one of the unused signals is chosen and combined. The decision process for choosing the best signal inputs is continual.

The present invention chooses the two largest or highest antenna inputs from a choice of four available input signals and combines them in a maximal-ratio combiner 120 to produce an output of higher value and greater consistency than in two-input diversity systems. Additionally, signal $\gamma_1$ may be adjusted by coefficient $\alpha_1$ and signal $\gamma_2$ may be adjusted by coefficient $\alpha_2$. The algorithm of the present invention continually inspects each input in the "decision block" 115 and compares it to a pre-defined threshold value. Should the value at an input drop below the threshold value, the algorithm chooses another input.

Figure 2:
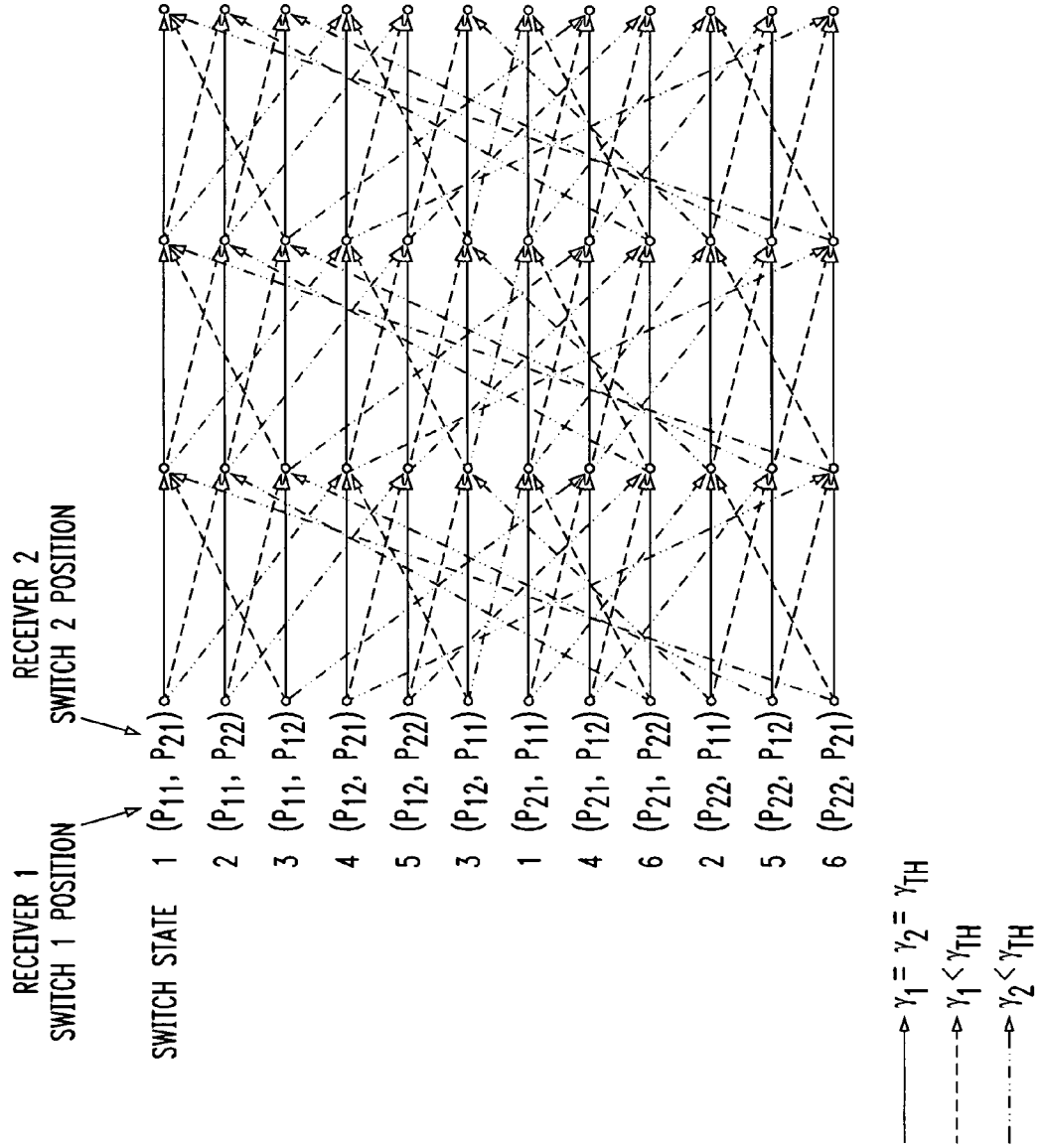
FIG. 2 is a state diagram of the switch diversity array concept.

FIG. 2 is a state diagram of the switch diversity array concept and provides the algorithm for switching between states. Notice that only one antenna is switched at a given time; this ensures that no transients are present at the output, which would interrupt the signal communication flow. While the algorithm is blind (no information ahead of time), it provides benefit since statistically there is only a small likelihood that two signals will be in a fade (at a low level) at the same time.

The algorithm for deciding if one of the two selected input signals has fallen below a pre-defined threshold, thereby requiring selection of another input signal, is as follows. The antennas are ranked with the rank being defined by antenna number. Antenna numbers can be assigned in any reasonable manner. When the metric on one of the antennas falls below the pre-defined threshold, a switch is made to the available antenna of the next highest rank. The leftmost column indicates switch state. The next column to the right indicates the possible antenna pair combinations. If the highest rank antenna is to be switched, then its rank is re-assigned the rank of 0 before the algorithm is applied. The available antenna set is defined as the set $\{(P_{11}, P_{12}), (P_{11}, P_{21}), (P_{11}, P_{22}), (P_{12}, P_{21}), (P_{12}, P_{22}), (P_{12}, P_{11}), (P_{21}, P_{11}), (P_{21}, P_{12}), (P_{21}, P_{22}), (P_{22}, P_{11}), (P_{22}, P_{12}), (P_{22}, P_{21})\}$—(pair of antennas currently being used)}. Referring again to FIG. 2, if antenna pair ($P_{11}$, $P_{12}$) is currently being used and it is found that the signal at $P_{12}$ has fallen below the pre-defined threshold, then a switch is made from $P_{12}$ to $P_{21}$ so that the antenna pair to be used becomes ($P_{11}$, $P_{21}$) as indicated by the dashed line going from the antenna pair ($P_{11}$, $P_{12}$) to antenna pair ($P_{11}$, $P_{21}$). If, once again using antenna pair ($P_{11}$, $P_{12}$), it is found that $P_{11}$ has fallen below the pre-defined threshold, then a switch should be made from $P_{11}$ to $P_{12}$ but $P_{12}$ is already in use as one of the input signals of the currently used pair. The next highest available rank antenna would have to be selected and that would be $P_{21}$ so that the antenna pair to be used becomes ($P_{21}$, $P_{12}$) as indicated by the dashed and dotted line going from antenna pair ($P_{11}$, $P_{12}$) to antenna pair ($P_{21}$, $P_{12}$). The plurality of states indicates time progression and that the process of antenna pair selection is continual over the life of the signal transmissions. The dashed and dotted lines on FIG. 2 thus represent state movement from an antenna pair when the higher antenna of the pair in the current antenna pair set has fallen below the pre-defined threshold and needs to be switched. The dashed lines on FIG. 2 thus represent state movement from an antenna pair when the lower antenna of the pair in the current antenna pair set has fallen below the pre-defined threshold and needs to be switched.

Figure 3:
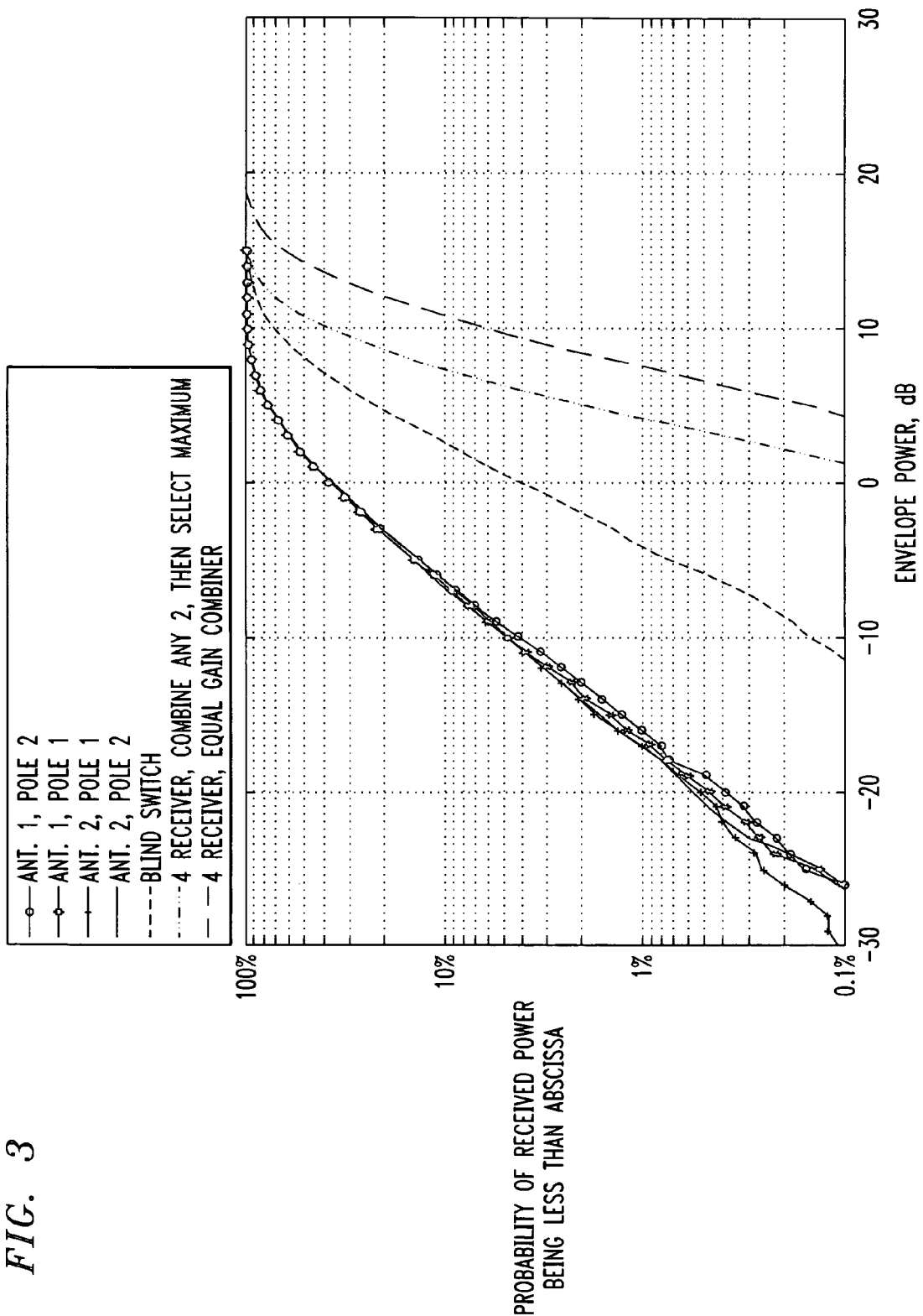
FIG. 3 shows the probability of received signal power being less than an abscissa envelope power in dB.
Figure 4:
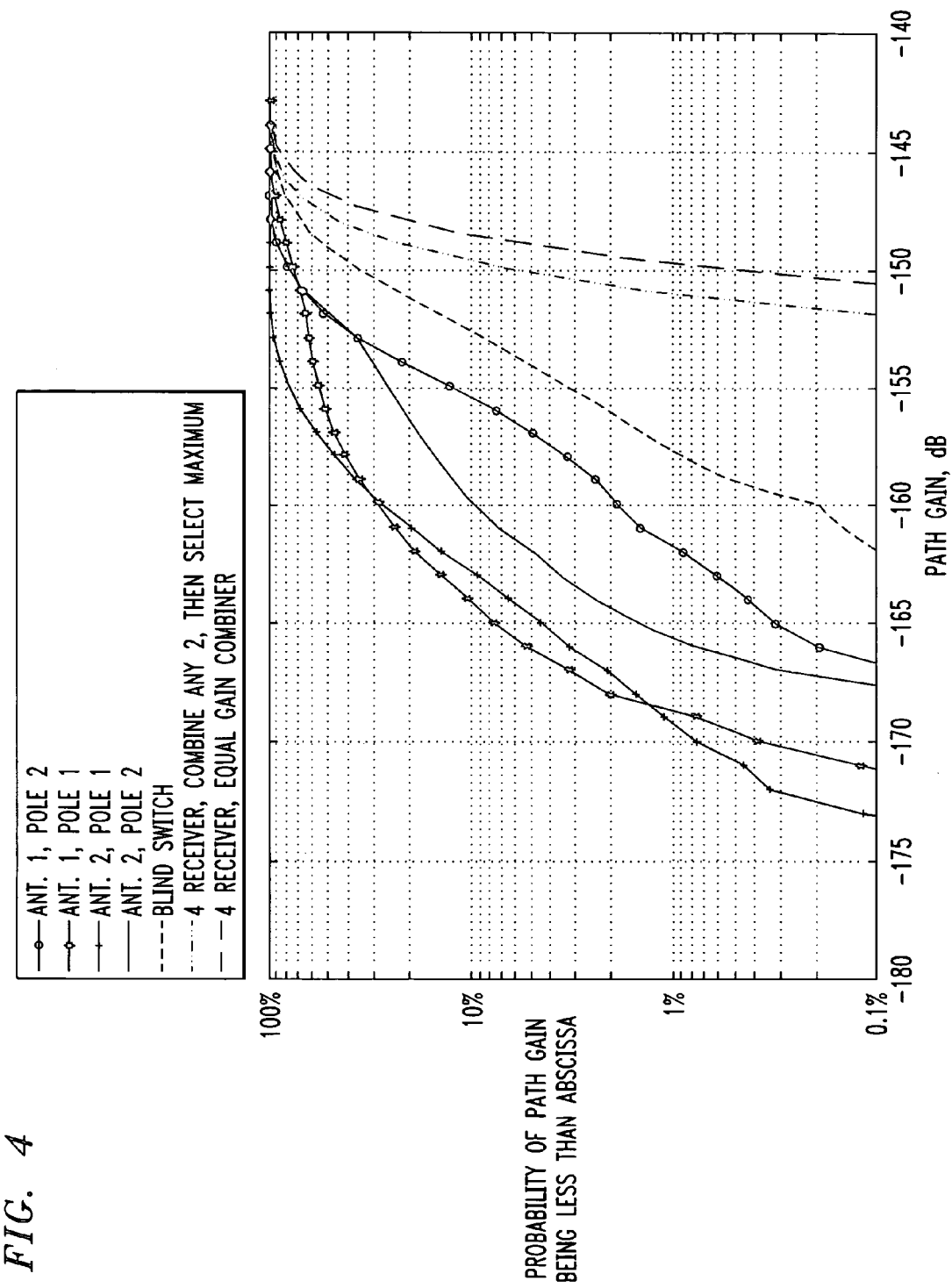
FIG. 4 shows the improvement in path loss.

In FIG. 3 the received signal envelope has a Rayleigh distribution. FIG. 3 shows the probability of received signal power being less than an abscissa envelope power in dB. FIG. 4 shows the path loss. FIGS. 3 and 4 provide simulation results for the statistical path gain improvement that arises from the use of the present invention. Inspection of these figures shows the improvement obtained using the present invention. In an ideal channel (such as cable or fiber), the plot in FIGS. 3 and 4 would be a vertical line in each case (on each figure) because the probability of receiving the signal is the same (or no variation in the received signal due to multipath). With the use of the present invention, the plot sharpens and becomes much more vertical, varying about 15 dB (indicating that the invention actually improves not only the median received power but it also improves the fade margin requirements for a given BER) range as indicated on FIG. 4.

Specifically, referring to FIG. 3, the maximal ratio combination of each of the possible antenna combinations is plotted. That is, antenna 1 with polarization A (ant 1, p1), antenna 1 with polarization B (ant 1, p2), antenna 2 with polarization A (ant 2, p1) and antenna 2 with polarization B (ant 2, p2) are plotted. Also plotted are the use of a blind switch, a four-receiver system that combines any two signals and then selects the maximum, and a four-receiver system that uses an equal gain combination. FIG. 4 plots the same combinations.

Figure 5:
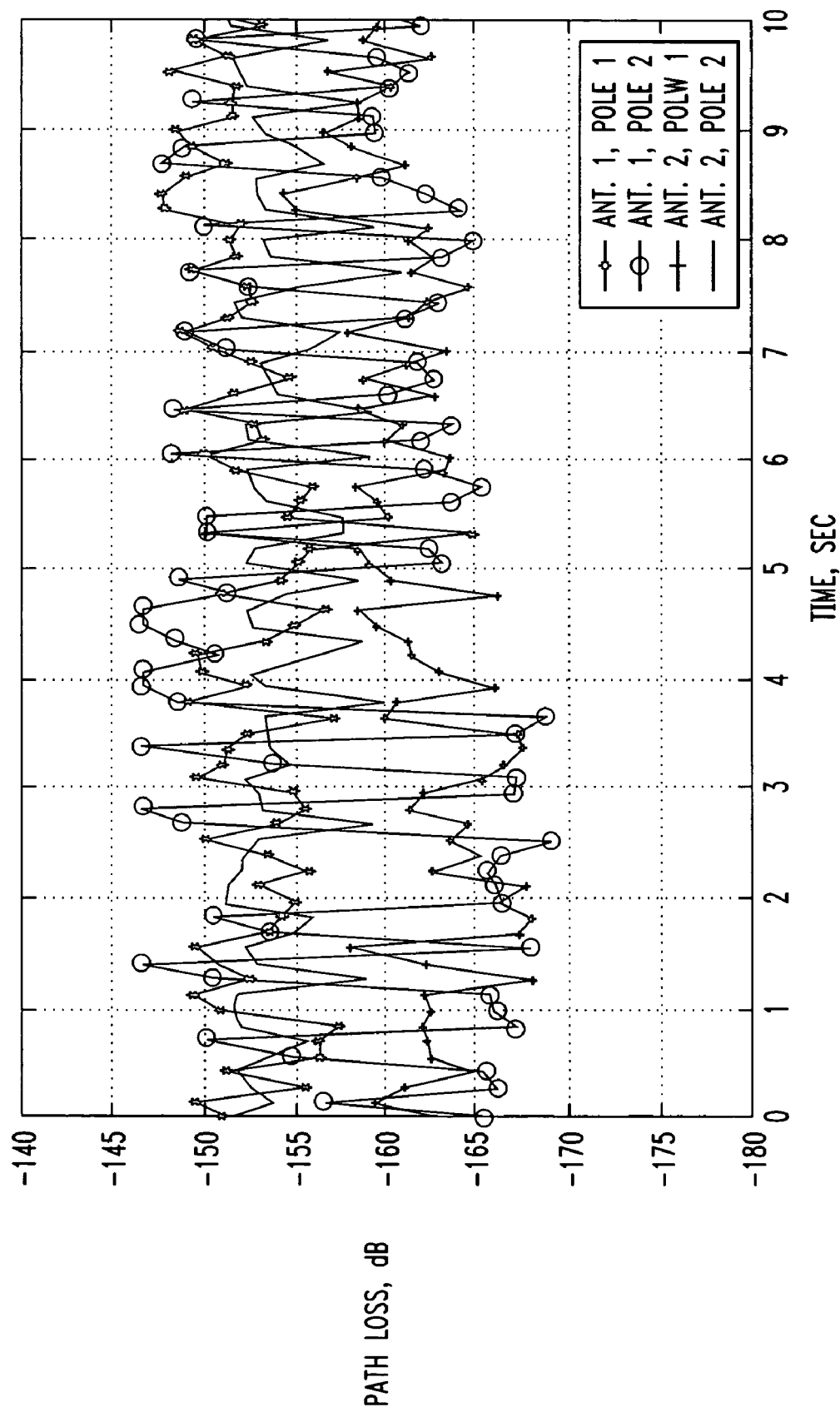
FIG. 5 shows the plot of average received power at the output of the receiver.

FIG. 5 shows the plot of average received power at the output of the receiver. Inspection of the figure shows that, for the two-input maximally combined case, the received power remains relatively constant over the time period. This is the topmost line in the graph.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A system for increasing Signal-to-Noise Ratio (SNR) in a wireless communication system, comprising:
    a plurality of antennas, each antenna providing a signal;
    a device, coupled to said plurality of antennas, for selecting a subset of signals provided by said plurality of antennas;
    a maximal-ratio combiner responsive to said subset of signals for developing an output signal; and
    a decision device for measuring the each signal of said subset against a predefined threshold, and for replacing a signal z of said subset of signals with a signal of said plurality of antennas that is not currently selected when said measuring determines that said signal z ought to be replaced.

2. The system according to claim 1, wherein said plurality of antennas further comprises four antennas.

3. The system according to claim 2, wherein said four antennas are arranged such that there are two antennas at each of two positions to accomplish spatial diversity and each of said two antennas at each of said two positions are in cross-polarization with each other in order to accomplish polarization diversity.

4. The system according to claim 1, wherein said selecting device selects the two largest signals from said signals provided by said plurality of antennas.

5. A method for increasing Signal-to-Noise Ratio (SNR) in a wireless communication system, comprising the steps of:
- receiving a signal from each of a plurality of antennas;
- selecting a subset of signals provided by said plurality of antennas;
- summing said selected subset of signals provided by said plurality of antennas;
- measuring each signal of said selected subset of signals against a predefined threshold; and
- periodically determining, based on said step of measuring, whether one of the signals of said selected subset ought to be replace, and replacing said one signal with another of said selected subset of signals provided by said plurality of antennas when said determining concludes that said one of the signals has fallen below said threshold.

6. The method according to claim 5, further comprising the step of optionally adjusting each of said selected subset of signals provided by said plurality of antennas by a coefficient.

7. The method according to claim 5, wherein said plurality of antennas further comprises four antennas.

8. The method according to claim 7, wherein said four antennas are arranged such that there are two antennas at each of two positions to accomplish spatial diversity and each of said two antennas at each of said two positions are in cross-polarization with each other in order to accomplish polarization diversity.

9. The method according to claim 5, wherein said selecting step selects the two largest signals from said signals provided by said plurality of antennas.

10. A system for increasing Signal-to-Noise Ratio (SNR) in a wire less communication system, comprising the steps of:
- means for receiving a signal from each of a plurality of antennas;
- means for selecting a subset of signals provided by said plurality of antennas;
- means for summing said selected subset of signals provided by said plurality of antennas;
- means for measuring each signal of said selected subset of signals against a predefined threshold; and
- means for replacing one signal of said selected subset of signals provided by said plurality of antennas that has fallen below said threshold in a single time cycle.

11. The system according to claim 10, further comprising means for optionally adjusting each of said selected subset of signals provided by said plurality of antennas by a coefficient.

12. The system according to claim 10, wherein said plurality of antennas further comprises four antennas.

13. The system according to claim 12, wherein said four antennas are arranged such that there are two antennas at each of two positions to accomplish spatial diversity and each of said two antennas at each of said two positions are in cross-polarization with each other in order to accomplish polarization diversity.

14. The system according to claim 10, wherein said means for selecting selects the two largest signals from said signals provided by said plurality of antennas.

\* \* \* \* \*